(12) United States Patent
Baker et al.

(10) Patent No.: US 7,940,758 B2
(45) Date of Patent: May 10, 2011

(54) DATA DISTRIBUTION IN A DISTRIBUTED TELECOMMUNICATIONS NETWORK

(75) Inventors: Albert J. Baker, Eatontown, NJ (US); Ezra Raphael Gilbert, Highland Park, NJ (US); Charles Cruse Hayden, Fair Haven, NJ (US); Lynn Kershner, Little Silver, NJ (US)

(73) Assignee: Avaya Inc., Basking Ridge, NJ (US)

( * ) Notice: Subject to any disclaimer, the term of this patent is extended or adjusted under 35 U.S.C. 154(b) by 370 days.

(21) Appl. No.: 11/688,751

(22) Filed: Mar. 20, 2007

(65) Prior Publication Data

US 2008/0232358 A1  Sep. 25, 2008

(51) Int. Cl.
*H04L 12/56* (2006.01)

(52) U.S. Cl. ............ 370/389; 370/252; 370/395.1; 370/410; 709/236; 709/238; 715/723

(58) Field of Classification Search .......... 370/252, 370/395.1, 410, 429, 412, 390; 707/10; 709/236, 709/238; 714/798–799; 715/723; 717/174, 717/171, 135

See application file for complete search history.

(56) References Cited

U.S. PATENT DOCUMENTS

| | | | |
|---|---|---|---|
| 6,570,882 B1 * | 5/2003 | Frene | 370/412 |
| 6,873,618 B1 * | 3/2005 | Weaver | 370/390 |
| 6,970,876 B2 | 11/2005 | Hotti et al. | |
| 6,978,396 B2 | 12/2005 | Ruuth et al. | |
| 7,437,473 B2 * | 10/2008 | Lu et al. | 709/236 |
| 7,461,374 B1 * | 12/2008 | Balint et al. | 717/174 |
| 7,570,882 B2 * | 8/2009 | Gutierrez et al. | 396/220 |
| 2001/0050903 A1 * | 12/2001 | Vanlint | 370/252 |
| 2004/0261028 A1 * | 12/2004 | Cotarmanac'h | 715/723 |
| 2007/0294263 A1 * | 12/2007 | Punj et al. | 707/10 |
| 2008/0069125 A1 * | 3/2008 | Reed et al. | 370/410 |

* cited by examiner

*Primary Examiner* — Robert W Wilson
*Assistant Examiner* — Mohamed Kamara
(74) *Attorney, Agent, or Firm* — DeMont & Breyer, LLC

(57) ABSTRACT

A technique is disclosed that enables a set of information to be represented by data packets, where those data packets can then be distributed as needed throughout the telecommunications system that uses the data. The data packet of the illustrative embodiment is an autonomous encapsulation of data, a subsection of a data model at a certain time in relation to other data in the system at another time. The data packet is identified at a particular time and value with a globally unique identifier. Relationships of the data packet to other data packets are made known by using references to the other packets. As a result, referenced data packets are retrieved throughout the system based on their relationships to each other. Whenever a data packet is transmitted or received, each node involved in the transmission applies rules that determine where the data has to be transmitted to and what to do with the data when received.

22 Claims, 9 Drawing Sheets

DATA DISTRIBUTION IN A DISTRIBUTED TELECOMMUNICATIONS NETWORK

FIELD OF THE INVENTION

The present invention relates to telecommunications in general, and, more particularly, to the representation and distribution of data in a distributed, telecommunications network.

BACKGROUND OF THE INVENTION

A modern telecommunications system has to be highly reliable, available, adaptable to network conditions, and able to provide a high quality of service. FIG. 1 depicts a telecommunications system with such requirements imposed on it. Telecommunications system 100 comprises a network of telecommunications nodes and endpoints, including master administration node 101, regional super-nodes 102-1 through 102-3, local nodes 103-1 through 103-7, and telecommunications endpoint 104, interconnected as shown. Each of the nodes depicted comprises one or more data-processing systems such as servers, routers, switches, and so forth. System 100 provides telecommunications services, such as call setup and handling, to the users of the endpoints present.

The network in system 100 reflects a tree-based network topology, in which clusters of local nodes (e.g., nodes 103-1 and 103-2, etc.) are connected to regional super-nodes (e.g., node 102-1, etc.), and regional super-nodes are connected to the master administration node. Any node is able to communicate with any other node throughout system 100, through the transmission of packets through possibly one or more intermediate nodes in the transmission system. Each node serves a particular role that is, in part, dependent on its location within system 100. Master administration node 101 serves as a single place to back-up and maintain the entire network from a single location. Each regional super-node 102 provides common processing and a common database for the area that the super-node supports. And each local node 103 provides access to the telecommunications endpoints associated with the local node. For example, local node 103-1 provides telecommunications service for telecommunications endpoint 104 as depicted.

A distributed network such as that in system 100 is complex in its data needs. The network is dynamic, as nodes and endpoints are added to or moved within the network and events such as calls are occurring. Features such as mobility throughout the network, duplication of resources for high availability, and geo-redundancy for disaster recovery are in increasing demand throughout the telecommunications industry. Even network upgrades can be challenging, as service providers of these telecommunications systems typically can only upgrade a part of their network of communications servers at a time.

In fact, because of the dynamic and complex nature of the network, there is no guarantee that any node in the network keeps the same set of data as any other node, at any given moment in time. The continually changing set of information used by system 100 is depicted in FIG. 2. Information set 200 represents an illustrative portion of the set of information stored throughout system 100: all of the data related to call control; data related to operations, administration, maintenance, and provisioning; subscriber data; and so forth. Traditionally, when subsets of data are transferred from one node to another, the data is transferred in portions that are based on software requirements or server requirements. Those portions are represented in FIG. 2 as apportioned data sets 201, 202, and 203, which are the areas that are delineated with solid lines. For example, at a given point in time, data set 201 might be stored at node 502-1, data set 202 might be stored at node 502-3, and data set 203 might be stored at node 503-4.

A consequence of apportioning data based on software or server requirements is that the availability of data at the right place and time is not guaranteed. For example, regional super-node 502-3, which has apportioned data set 202, might actually require access to the data in required data subset 212, delineated in the figure with dashed lines. Because of this data mismatch, node 502-3 is missing some important data, which is depicted by the portion of subset 212 that overlaps into data set 201. Simultaneously, node 502-3 has superfluous data, namely that data outside of data subset 212 but within data set 202. Alternatively, there might be other times when regional super-node 502-3 needs only the data subset 211, which is delineated in the figure by the dotted-and-dashed line. As a direct consequence of the data mismatch, servers that are used to route calls often do not know how to route the call because those servers do not have the current routing data; because of this, some calls cannot be put through.

What is needed is a technique that enables an improved distribution of the data that is essential to providing high-quality, telecommunications services within a network, without some of the disadvantages in the prior art.

SUMMARY OF THE INVENTION

The present invention enables a set of information to be represented by data packets, where those data packets can then be distributed as needed throughout the telecommunications system that uses the data. Each data packet is a fundamental building block in the data representation and distribution technique of the illustrative embodiment. Essentially, each packet is a component in the modeling of the data in the telecommunications system.

The data packet of the illustrative embodiment has various unique properties, some of which are described here. The data packet is an autonomous encapsulation of data, a subsection of a data model at a certain time in relation to other data in the system at another time. The data packet is identified at a particular time and value with a globally unique identifier. Relationships of the data packet to other data packets are made known by using references to the other packets. As a result, referenced data packets are retrieved throughout the system based on their relationships to each other.

In accordance with the illustrative embodiment, whenever a data packet, including a query for one or more data packets, is transmitted or received, each node involved in the transmission applies business logic. These rules for handling one or more data packets determine where the data has to be transmitted to and what to do with the data when received. Additionally, the rules can be based on the relationship of two or more nodes to each other. For example, a master administration node might have transmission rules that it has distributed to all regional nodes; in a situation where a first regional node is a backup of a second regional node, the master node has distributed equivalent copies to both regional nodes. Then, the first regional node might have rules specifying that the node updates the routing rules in its database and then distributes those routing rules to all of its sub-nodes, such as local access nodes.

The technique of the illustrative embodiment of the present invention is advantageous over some techniques in the prior art because the data is no longer tied directly to specific software commands or relationships. Instead, the data packets are used to express a value in the system, which is then transmitted to appropriate nodes throughout the network by applying the business rules of that network. For example, suppose that a master administration node in the network adds a user to home node C, where home node C sub-tends home node B and where home node B sub-tends home node A. For routing to go from node A to B to C to reach the new user, nodes A and B apply transformational logic and update routing tables based on this new data. When the data packet reaches node C, the user record is stored. If there are redundant nodes to node C, then those nodes can also get copies of the data. In the technique of the illustrative embodiment, the data distribution in this example becomes a relatively simple matter of flagging a node as redundant to another node, instead of developing difficult database replication, hard disk replication, or memory replication techniques at the operating system or platform level, as in some techniques in the prior art.

The illustrative embodiment of the present invention comprises: forming a first data packet that comprises (i) a self-identifier field, (ii) a payload field, and (iii) a references field; populating the self-identifier field with a first identifier that is unique within a telecommunications system, wherein the first identifier identifies the first data packet; and populating the references field with a first reference to a second identifier that is unique within the telecommunications system, wherein the second identifier identifies a second data packet.

DETAILED DESCRIPTION

Figure 1:
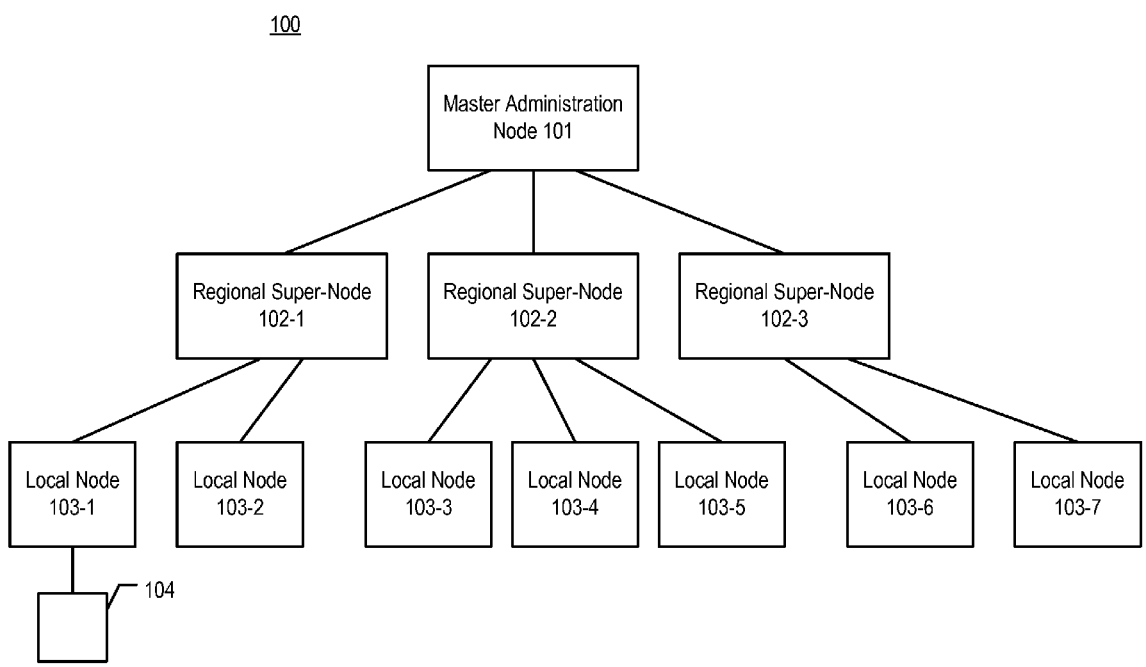
FIG. 1 depicts telecommunications system 100 in the prior art.
Figure 2:
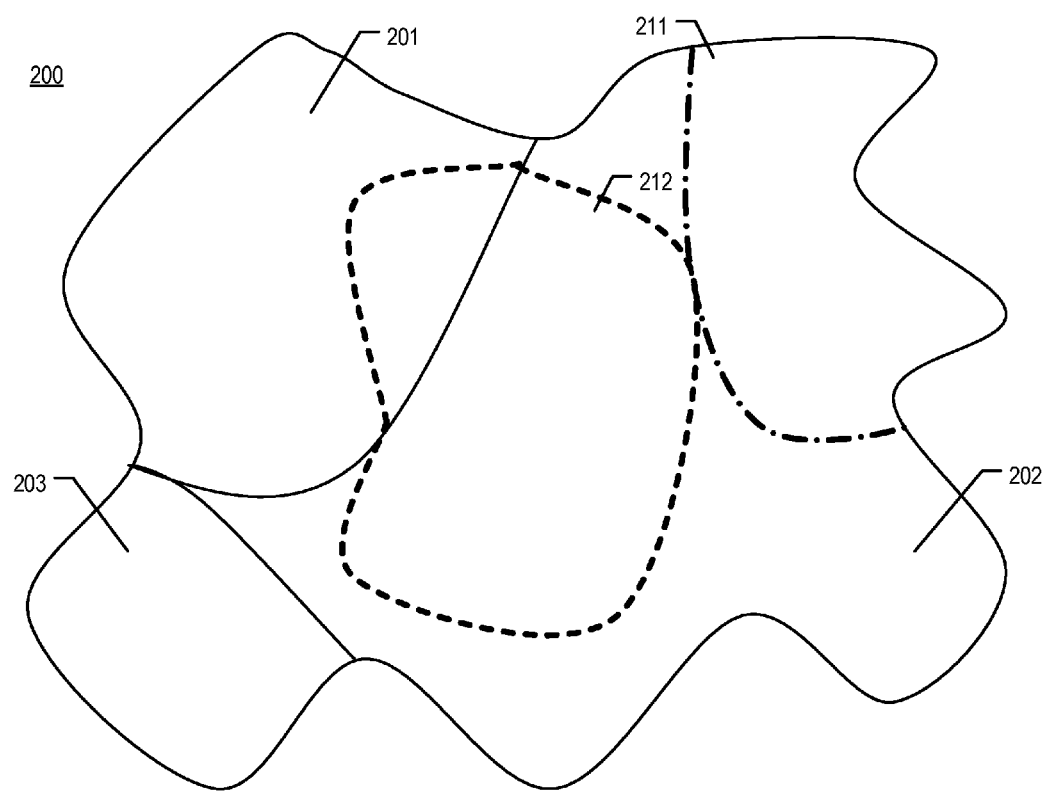
FIG. 2 depicts information set 200, which represents an illustrative portion of the information stored throughout telecommunications system 100.
Figure 3:
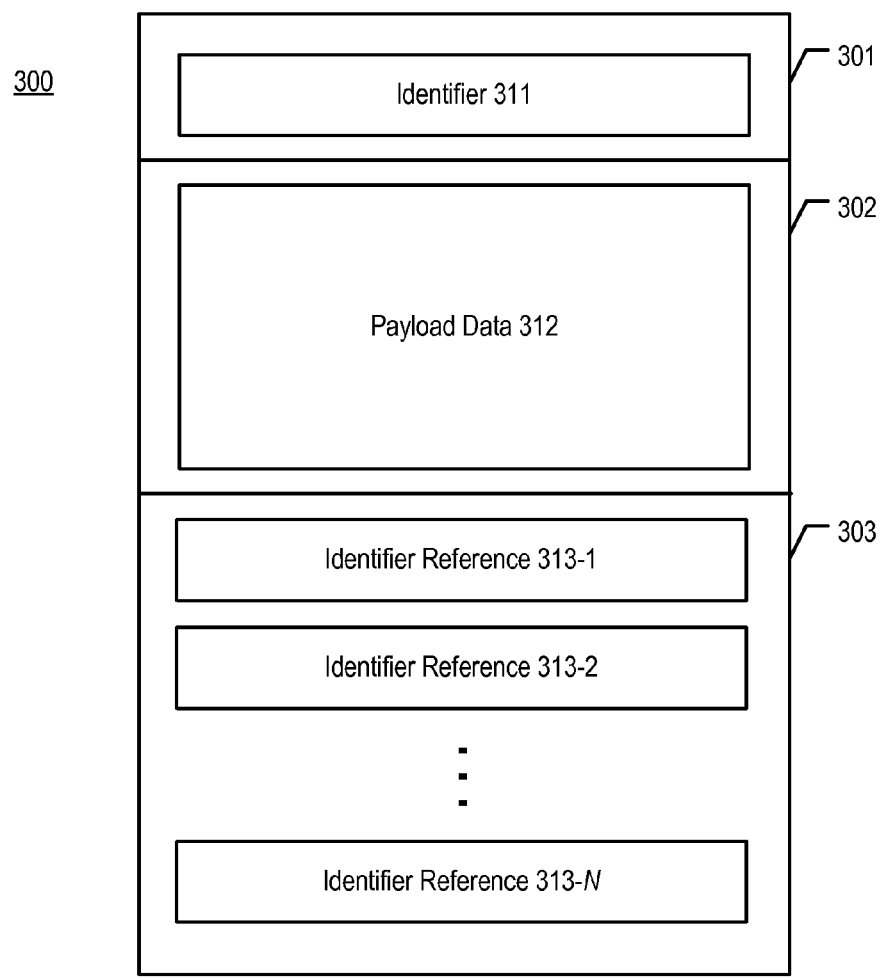
FIG. 3 depicts data packet 300 in accordance with the illustrative embodiment of the present invention.

FIG. 3 depicts data packet 300, a fundamental building block in the data representation and distribution technique of the illustrative embodiment. Packet 300 is a component in the modeling of the data in the telecommunications system to which the technique applies. Packet 300 has the following properties:

i. The packet is an autonomous encapsulation of data, a subsection of a data model at a certain time in relation to other data in the system at another time.

ii. The packet is identified at a particular time and value with a globally unique identifier.

iii. The packet's relationships to other data packets are made known with references to the other packets that are identified for packet 300 in that instant in time.

iv. The actual payload data that constitutes the packet is opaque and not processed by the transport system that transfers the packet from node to node.

v. The references and data contained within the packet can be processed by the business logic applications during and after transmission.

vi. The referenced data packets are retrieved throughout the system based on their relationships to each other, and business rules drive how much and when to retrieve referenced data packets.

Data packet 300 comprises self-identifier field 301, payload field 302, and references field 303, interrelated as shown. As those who are skilled in the art will appreciate, the information contained within data packet 300 can be represented in a different way than that depicted.

Self-identifier field 301 comprises identifier 311, which identifies the data packet. Identifier 311 has a value that is globally unique throughout the telecommunications system in which the data packet is present.

Payload data field 302 comprises content that is opaque to the intermediate nodes that relay data packet 300 between the data packet's resident node and the node that is requesting the data packet. Typically, the content comprises a portion of the information set used by the system of the illustrative embodiment—in other words, data that is used to provide and maintain telecommunications functions, such as call handling, throughout the system. Alternatively, the content can include transmission rules, translation logic, node schema, and other data items that are used to support the data distribution technique of the illustrative embodiment.

References field 303 comprises one or more references 313-1 through 313-N, wherein N is a positive integer, to other data packets. Each reference identifies one another data packet and comprises i) the other data packet's identifier (such as identifier 311), ii) the location of the other data packet (such as the address in the network of the node at which the packet can be found), or iii) some other indication of the referenced data packet, alone or in combination. The list of references in references field 303, coupled with the ability of the illustrative embodiment to retrieve data packets by reference from elsewhere in the network, enables a retrieving node to obtain all of the data packets that the node requires, whenever the node requires the data.

Figure 4:
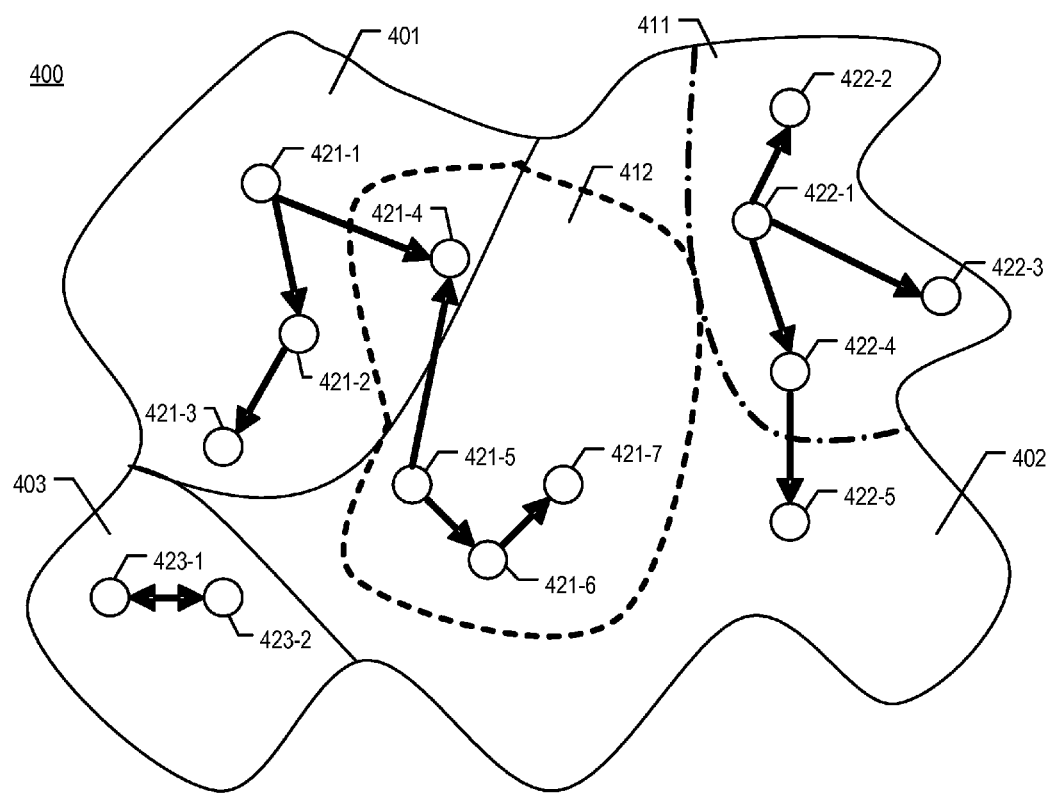
FIG. 4 depicts information set 400, which comprises the data represented by data packets 421-1 through 421-7, data packets 422-1 through 422-5, and data packets 423-1 and 423-2.

The concept of data packets referencing other data packets is illustrated in FIG. 4. Information set 400 represents at least a portion of the information used by the telecommunications system of the illustrative embodiment and comprises the data that is represented by data packets 421-1 through 421-7, data packets 422-1 through 422-5, and data packets 423-1 and 423-2. Each data packet can reference, or point to, at least one other packet, as indicated by the arrowed lines. For example, data packet 421-1 references data packets 421-2 and 421-4; in turn, data packet 421-2 references data packet 421-3, while data packet 421-4 is itself referenced not only by data packet 421-1 but by packet 421-5 as well; and so forth. Furthermore, each data packet can reference other data packets that are resident either in the same node as the referencing data packet or in a different node entirely.

Figure 5:
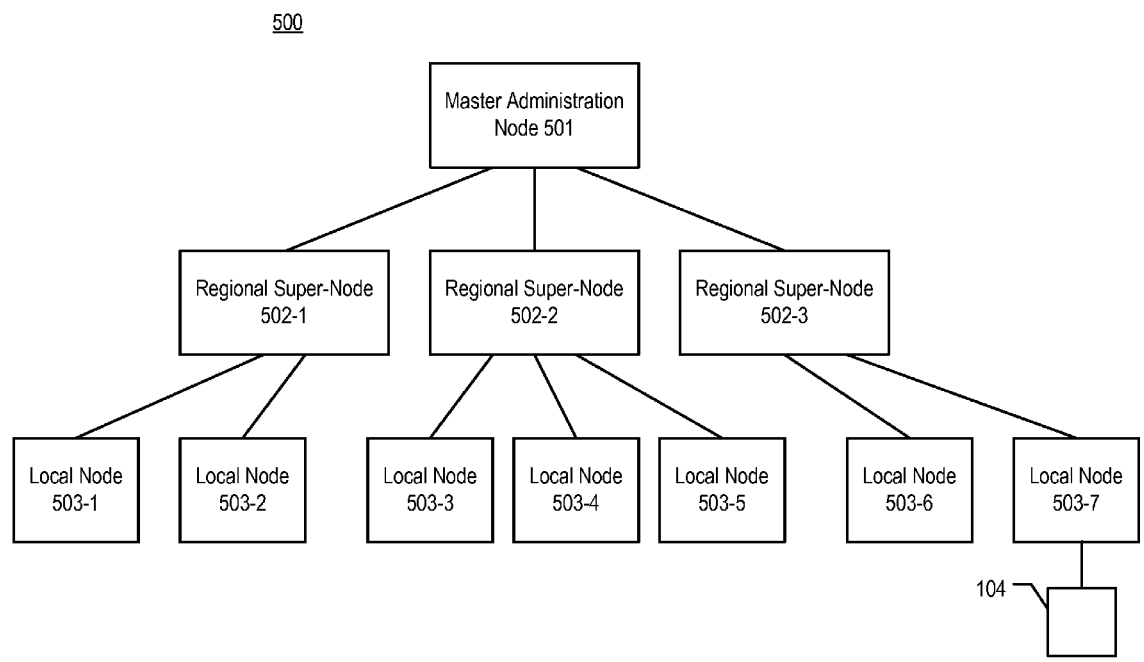
FIG. 5 depicts telecommunications system 500, in accordance with the illustrative embodiment of the present invention.

The data representation and distribution technique of the illustrative embodiment is used to identify all of the data that is needed to support one or more functions, nodes, endpoints, users, or any other object within a system such as telecommunications system 500 shown in FIG. 5. For example, suppose that a particular set of data is required by a node to support a particular telecommunications function, such as the handling of a call for a particular telecommunications endpoint (e.g., endpoint 104, etc.) in system 500. In this example, the data set is described by the data contained within the data payloads of packets 421-4 through 421-7, which coincides with data portion 412. To retrieve the relevant data set, the retrieving node launches a query for all of the packets of data that are relevant to the endpoint of interest, and the relevant data packets are retrieved (i.e., packets 421-4 through 421-7).

Telecommunications system 500, depicted in FIG. 5, comprises a network of nodes and endpoints, including master administration node 501, regional super-nodes 502-1 through 502-3, local nodes 503-1 through 503-7, and telecommunications endpoint 104, interconnected as shown. Each of the nodes depicted comprises one or more data-processing systems such as servers, routers, switches, and so forth. System 500 is based on the Session Initiation Protocol (SIP), as is well-known in the art. It will be clear to those skilled in the art, after reading this specification, how to make and use alternative embodiments of the invention in which the telecommunications system is based on something other than SIP.

The network of system 500 reflects a tree-based network topology, in which clusters of local nodes (e.g., nodes 503-1 and 503-2, etc.) are connected to regional super-nodes (e.g., node 502-1, etc.), and the regional super-nodes are connected to master administration node 501. As those who are skilled in the art will appreciate, however, the data representation and distribution technique of the illustrative embodiment can be applied to a network that features: i) a topology other than one that is tree-based; ii) a different number of nodes than depicted; or iii) a different number of levels than depicted, either alone or in combination.

In system 500, each type of node serves a different purpose in the network. Master administration node 501 serves as a single place to back-up and maintain the entire network from a single location. Each regional super-node 502 provides common processing and a common database for the area that the super-node supports. Each local node 503 provides access to the endpoints associated with the local node. For example, local node 503-1 provides telecommunications service for endpoint 104.

In accordance with the illustrative embodiment, the data packets can be resident across the various nodes throughout system 500. For example, Table 1 depicts an illustrative table that shows where each data packet in FIG. 4 is resident, along with the references that each data packet points to.

TABLE 1

Data Packet Storage Locations and References

| Data Packet | Resident Node | References |
|---|---|---|
| 421-1 | 503-1 | 421-2, 421-4 |
| 421-2 | 503-1 | 421-3 |
| 421-3 | 503-1 | |
| 421-4 | 501 | |
| 421-5 | 503-7 | 421-4, 421-6 |
| 421-6 | 502-3 | 421-7 |
| 421-7 | 502-3 | |
| 422-1 | 502-1 | 422-2, 422-3, 422-4 |
| 422-2 | 501 | |
| 422-3 | 501 | |

TABLE 1-continued

Data Packet Storage Locations and References

| Data Packet | Resident Node | References |
|---|---|---|
| 422-4 | 502-2 | 422-5 |
| 422-5 | 503-3 | |
| 423-1 | 501 | 423-2 |
| 423-2 | 503-2 | 423-1 |

As can be seen in Table 1, the data packets can be found throughout system 500. If a node needs to obtain some or all of the data packets for a particular set of data, the node queries the other nodes for the data. The system of the illustrative embodiment provides a mechanism for the querying of data, in which a query will be routed up through the system until the data is found. The initial query by a node can either be to the references contained in the first data packet, if known; alternatively, if the first data packet is not known, the initial query can be to a default node, such as master administration node 501, which then determines which packet is the first data packet of interest for a particular processing object, and then successive queries can be launched based on the references contained within each data packet retrieved.

An example is provided here of how the references that are contained within the data packets are used, according to the data packet storage locations and references shown in Table 1. Looking at the thread of data packets beginning with packet 421-1 (i.e., the "first packet"), packet 421-1 contains two references: one to packet 421-2 (i.e., the "second packet") and one to packet 421-4 (i.e., the "third packet"). Since second packet 421-2 is stored at node 503-1, the first reference contained within packet 421-1 points to either packet 421-2 itself (via its globally unique identifier) or to node 503-1 as the storage location of packet 421-2. As those who are skilled in the art will appreciate, there are many conventions that can be used to reference, address, or point to packet 421-1 and the other packets. Continuing with the example, first data packet 421-1 also contains a second reference, which points to third packet 421-4 (i.e., at node 501). Meanwhile, second packet 421-2, in turn, contains a reference that points to packet 421-3 (i.e., also at node 501).

The thread of data packet references continues, next with data packet 421-5, which is resident at node 503-7 and which contains references that point to packets 421-4 and 421-6 (i.e., at nodes 501 and 502-3, respectively). Finally, data packet 421-6 contains a reference that points to packet 421-7 (i.e., also at node 502-3).

In other words, by querying for the first data packet in a thread, such as packet 421-5, any node is able to access the related data in that thread or threads, such as packets 421-4, 421-6, and 421-7, by looking at the references contained with the packet currently being examined. So for example, if endpoint 104 is plugged into local node 503-7, that node can then query for all of the data packets that node 503-7 will need to provide service to endpoint 104 and its user, within telecommunications system 500. If node 503-7 has access to the first data packet, then it uses the references within that packet to query for the related packets, possibly stored elsewhere within system 500. If node 503-7 does not know which packet is the first data packet that the node needs, then it can follow an initialization procedure—for example, querying master administration node 501 by default.

In accordance with the illustrative embodiment, whenever a data packet, including a query for one or more data packets, is transmitted or received, each node involved in the transmission applies business logic, such as through a business rules engine or scripting interface. These rules for handling one or more data packets determine where data has to be transmitted to, and what to do with that data when it is received. Additionally, the rules can be based on the relationship of two or more nodes to each other. For example, master administration node 501 might have transmission rules that it has distributed to all regional super-nodes; in a situation where regional super-node 502-2 is a backup of regional super-node 502-1, node 501 has distributed equivalent copies to both nodes. Then, node 502-1 might have rules that it updates routing rules in its database and then distributes those routing rules to all of its sub-nodes (i.e., nodes 503-1 and 503-2). Additionally, the transmission rules, translation logic, and node schema can themselves be distributed by means of inter-node messaging.

When each node goes into service, in accordance with the illustrative embodiment, the node queries and registers itself on system 500, understanding its position in the network and how it wants to receive data. The type of registry performed for each node is based on installation criteria (e.g., the node is a regional node versus a local node, etc.). The registration initiates a synchronization of data through the distribution of data to that node based on the network configuration. For example, if local node 503-4 goes into service and registers with regional super-node 502-2, node 502-2 would distribute the appropriate data to node 503-4, which can entail querying other nodes throughout system 500 for the data.

Figure 6:
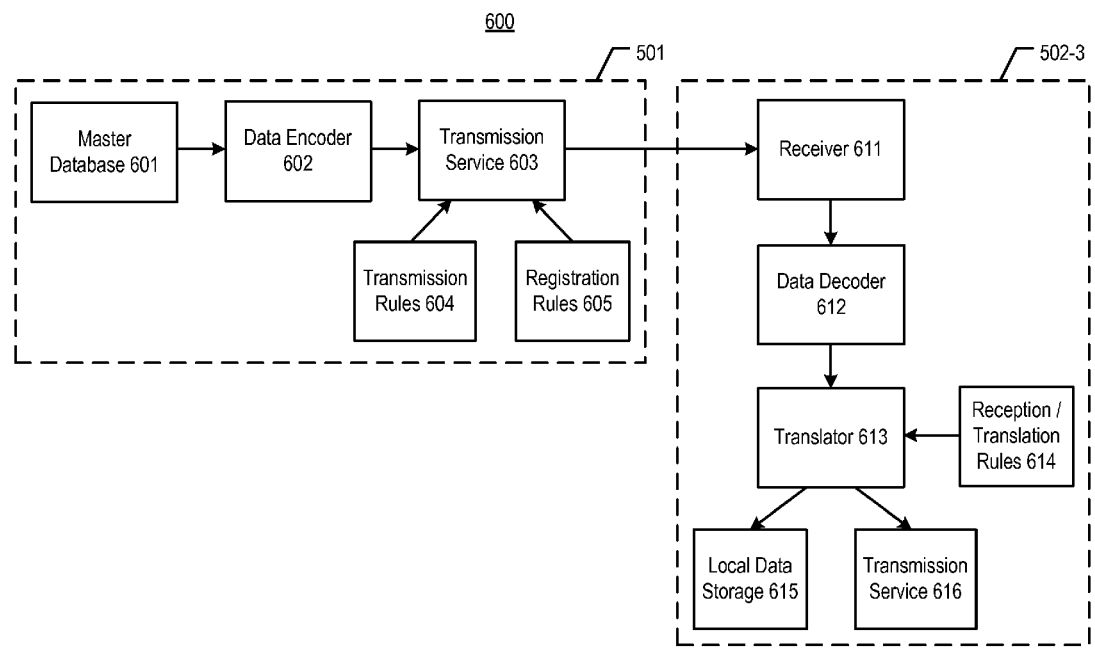
FIG. 6 depicts transmission system 600, which comprises the transmitter part of master administration node 501 and the receiver part of regional super-node 502-3.

FIG. 6 depicts transmission system 600, which comprises as an example the transmitter part of master administration node 501 and the receiver part of regional super-node 502-3. As those who are skilled in the art will appreciate, each node in system 500 comprises a transmitter part and a receiver part, to effect communications with other nodes. When another node requests a data packet from node 501 via a query, node 501 retrieves the data packet from its database 601. Node 501 encodes the data packet via encoder 602, so that the data packet can be transferred over multiple networks, to achieve straightforward traversing of the network address translation devices in Internet Protocol (IP) networks, as well as traversing firewalls in private networks. When one of these network level traversals occurs, special transmission or translation logic updates the IP address, in order to make the transferred data valid on both sides of the network.

Transmission service 603 then applies one or both of transmission rules 604 and registration rules 605, depending in part on the state of the node (e.g., initializing, active, etc.). Service 603 then transmits the data packet, in accordance with the rules applied.

Receiver 611 of regional super-node 502-3 receives the data packet from node 501 and decodes the data packet via decoder 612. Node 502-3 then applies reception or translation rules 614, depending on the circumstances. Node 502-3 then stores the decoded data packet in local data storage 615 or re-transmits the re-encoded, translated data packet via transmission service 616, depending on whether node 502-3 is the node that queried for the data packet in the first place or is merely acting as a relay for the data packet, on behalf of another node, such as node 503-7.

Figure 7:
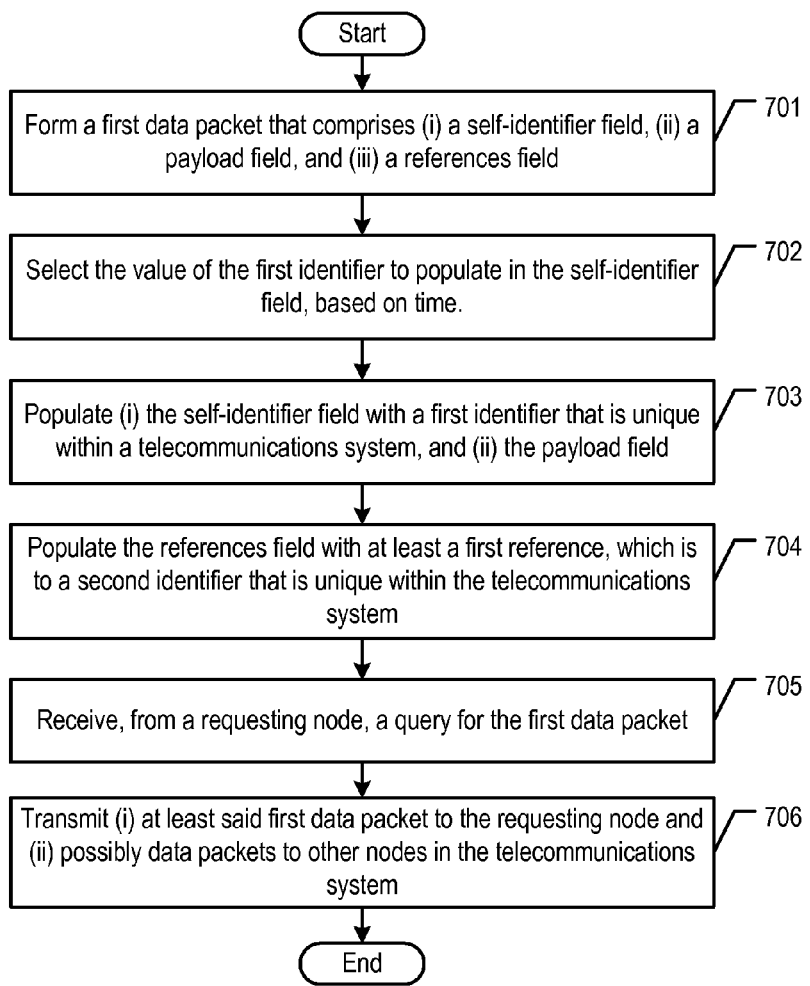
FIG. 7 depicts a flowchart of the salient tasks for forming, populating, and transmitting one or more data packets that represent the information set of system 500, in accordance with the illustrative embodiment of the present invention.
Figure 8:
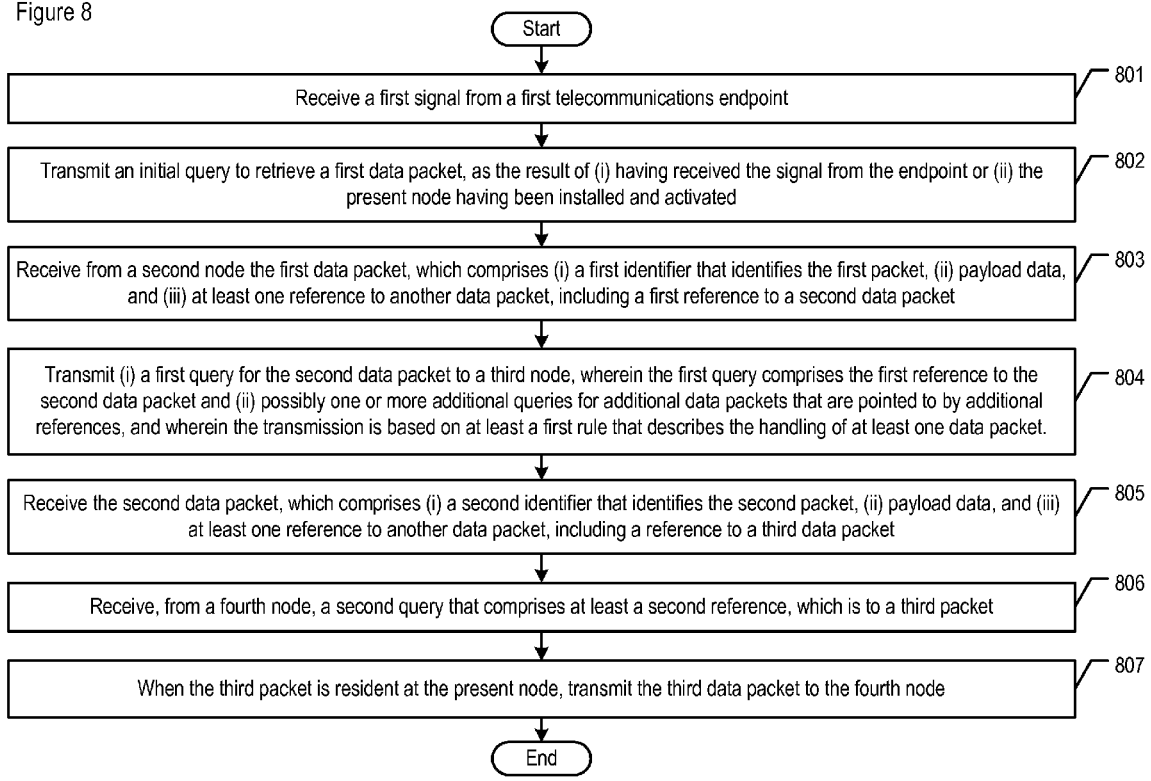
FIG. 8 depicts a first flowchart of the salient tasks for processing queries and one or more data packets, in accordance with the illustrative embodiment of the present invention.
Figure 9:
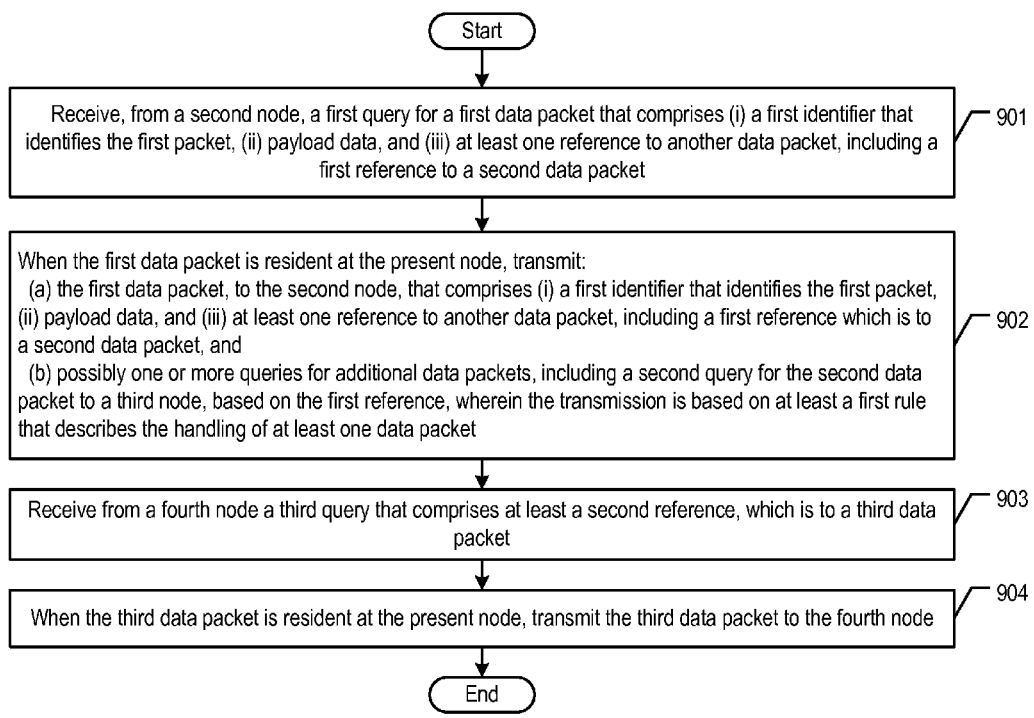
FIG. 9 depicts a second flowchart of the salient tasks for processing queries and one or more data packets, in accordance with the illustrative embodiment of the present invention.

FIGS. 7 through 9 depict flowcharts of the salient tasks used in the creation and distribution of data packets that represent the information set used by system 500, in accordance with the illustrative embodiment of the present invention. As those who are skilled in the art will appreciate, some of the tasks that appear in FIGS. 7 through 9 can be performed in parallel or in a different order than that depicted, both within each flowchart and across the flowcharts.

FIG. 7 depicts a flowchart of the salient tasks for forming, populating, and transmitting one or more data packets that represent the information set of system 500, in accordance with the illustrative embodiment of the present invention. For illustrative purposes, administrative node 501 is the node that performs the described tasks. It will be clear to those skilled in the art, however, how to make and use embodiments of the present invention in which another node or other nodes in system 500 perform some or all of the tasks described with respect to FIG. 7, either as opposed to or in addition to node 501.

At task 701, node 501 forms a first data packet that comprises (i) self-identifier field 301, (ii) payload field 302, and (iii) references field 303. It will be clear to those skilled in the art how to represent the data that constitute information set 400 across multiple data packets.

At task 702, node 501 selects a value for the identifier of the first data packet, where the value is unique throughout telecommunications system 500—that is, the identifier value is globally unique throughout the system of nodes that will use the data packet. In some embodiments, the identifier value is selected based on time; this is done to differentiate between two data packets that comprise the same details, except for a difference in time. For example, one data packet might represent a billing record for a subscriber that is current as of Monday, while another data packet might represent a billing record for the same subscriber that is current as of Tuesday. As those who are skilled in the art will appreciate, in some alternative embodiments, the value of the identifier can be based on other properties.

At task 703, node 501 populates the self-identifier field of the first data packet with the identifier whose value has been determined at task 702. As those who are skilled in the art will appreciate, the self-identifier field might comprise information other than the identifier.

Node 501 also populates the payload field of the first data packet with data from that portion of information set 400 to be represented in the data packet. It will be clear to those skilled in the art how to apportion the data of information set 400 amongst the data packets to be formed, stored, and shared throughout system 500. For example, the data in the payload field for the first data packet might represent a part of the subscriber database for the user of endpoint 104, or routing information to be used by node 503-1, or a transmission rule, and so forth.

At task 704, node 501 populates the references field with at least a first reference. The first reference specifies an identifier that is used to identify a second data packet available somewhere in system 500. The value of the identifier referred to here is also unique throughout system 500, as is the value of the identifier of any data packet.

In addition to forming and populating the first data packet, node 501 goes on to form and populate other data packets, each comprising an identifier, payload data, and possibly one or more references to other data packets.

In addition to forming and populating data packets, node 501 is capable of receiving and processing queries from other nodes, and of querying other nodes for data packets. At task 705, node 501 receives a query for a data packet (e.g., the first data packet, etc.). As those who are skilled in the art will appreciate, a query can be a general interrogation that asks the receiving node if it has the data packet being sought after, or a query can be a specific request that instructs the receiving node for the data packet. If node 501 (i.e., the node receiving the query) does not have the data packet being requested, the node may pass the query on to one or more other nodes.

If node 501 does, in fact, have the data packet being requested, at task 706 node 501 transmits the data packet to the requesting node. Additionally, node 501 possibly transmits other data packets to either the requesting node or to other nodes in system 500. The transmission is based on one or more rules that describe the handling of one or more data packets. Node 501 might transmit one or more queries to other nodes. As an example, if the query was for the first data packet, in addition to transmitting the first data packet to the requesting node, node 501 might also i) examine the references within the first data packet, ii) determine that the first data packet contains two references, and iii) transmit a query for each reference, in order to retrieve those data packets to which the references point. As a second example, if node 501 determines that the references in the first data packet point to data packets that are also resident at node 501, the node will transmit those packets as well, without the need for additional queries. As those who are skilled in the art will appreciate, each node can receive one or more queries or data packets, or both, and in response transmit one or more queries or data packets, or both.

FIG. 8 depicts a first flowchart of the salient tasks for processing queries and for processing one or more data packets that represent the information set of system 500, in accordance with the illustrative embodiment of the present invention. In particular, FIG. 8 describes a first technique of leaving it to the requesting node to send a query, receive a data packet, send additional queries based on the references in the received data packet, and so forth, until the thread of data being sought after has been accumulated. For illustrative purposes, local node 503-7 is the node that performs the described tasks. It will be clear to those skilled in the art, however, how to make and use embodiments of the present invention in which another node or other nodes in system 500 perform some or all of the tasks described with respect to FIG. 8, either as opposed to or in addition to node 503-7.

At task 801, node 503-7 receives a first signal from a first telecommunications endpoint (e.g., endpoint 104, etc.). The signal might occur as the result of the endpoint being "plugged in", or it might occur as the result of the endpoint attempting to make a call.

At task 802, node 503-7 transmits an initial query to retrieve a first data packet. As an example, this can be the result of having received the signal from the endpoint. As another example, this can be the result of node 503-7 having been installed, now activated, and attempting to discover the telecommunications system of which the node is now a part.

At task 803, node 503-7 receives from a second node (e.g., node 501, node 502-3, node 503-1, etc.) the first data packet.

At task 804, node 503-7 transmits a first query for one or more data packets that are pointed to by the references in the received first data packet. Alternatively, node 503-7 might transmit one query for each referenced data packet. The transmission is based on one or more rules that describe the handling of one or more data packets.

At task 805, node 503-7 receives the one or more additional data packets. In turn, node 503-7 then queries for those data packets that are referenced within the received data packets, and repeats this cycle of query and data packet reception until the node has the data it needs.

Meanwhile, node 503-7 is also capable of processing queries from other nodes. At task 806, node 503-7 receives a query that comprises a reference to a data packet.

If node 503-7 has the data packet referenced in the query, at task 807 the node transmits the data packet back to the requesting node.

FIG. 9 depicts a second flowchart of the salient tasks for processing queries and for processing one or more data packets that represent the information set of system 500, in accordance with the illustrative embodiment of the present invention. In particular, FIG. 9 describes a second technique of receiving a query for a data packet from a requesting node, transmitting the data packet back to the requesting node, and transmitting additional queries based on the references in the transmitted data packet. In other words, the nodes in system 500 assist the requesting node in accumulating the data by sending queries themselves. For illustrative purposes, regional super-node 502-3 is the node that performs the described tasks. It will be clear to those skilled in the art, however, how to make and use embodiments of the present invention in which another node or other nodes in system 500 perform some or all of the tasks described with respect to FIG. 9, either as opposed to or in addition to node 502-3.

At task 901, node 502-3 receives a first query to retrieve a first data packet. This can be the result of another node (e.g., node 503-7, etc.) having been installed, is now activated, and is attempting to discover the system of which it is now a part. This can also be the result of another node merely requesting a data packet, in the course of accumulating data.

At task 902, when the first data packet is resident at node 502-3, the node transmits the first data packet to the requesting node. Additionally, node 502-3 examines the references within the first data packet and transmits one or more queries for one or more references, to retrieve the pointed-to data packets at other nodes. The transmission is based on one or more rules that describe the handling of one or more data packets.

Meanwhile, node 502-3 is also capable of processing additional queries from other nodes than the one that requested the first data packet. At task 903, node 502-3 receives a query that comprises a reference to a second data packet.

If node 502-3 has the data packet that is referenced in the query, at task 904 the node transmits the second data packet back to the requesting node. As in task 902, node 502-3 can then go on to proliferate queries for additional data packets to other nodes, based on the references contained within the second data packet.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system comprising:
   a set of information that represents a telecommunications system via a plurality of data packets that are distributed within the telecommunications system, wherein each data packet in the plurality of data packets comprises a payload field that encapsulates some information from the set of information;
   a first node that:
   (A) forms a first data packet in the plurality of data packets, wherein the first data packet comprises (i) a self-identifier field, (ii) the payload field, and (iii) a references field, and
   (B) populates the self-identifier field with a first identifier that is time-dependent and unique within the telecommunications system and that identifies the first data packet, and
   (C) populates the references field with a first reference to a second identifier that is unique within the telecommunications system and that identifies a second data packet in the plurality of data packets, and (D) comprises an association between (i) the set of information and (ii) the first identifier; and a second node that retrieves, based on the association in the first node, at least part of the set of information from at least some of the plurality of data packets that are distributed within the telecommunications system.

2. The method of claim 1 wherein:
the first reference represents where the second data packet is resident within the telecommunications system, and
the set of information further comprises at least one datum in a payload field of the second packet.

3. The method of claim 1 further comprising transmitting the first data packet from the first node to a second node, based on at least a first rule that describes the handling of the first data packet.

4. The method of claim 3 wherein the first data packet comprises at least a second rule that describes the handling of a received data packet.

5. The method of claim 3 wherein a first datum in the payload field of the first data packet and a second datum in the second data packet in combination enable the second node to perform a first telecommunications function.

6. The method of claim 5 wherein the first telecommunications function is the handling of a call that involves a first telecommunications endpoint.

7. The method of claim 3 wherein the transmitting of the first data packet from the first node to the second node is based on at least one rule that is based on the relationship of at least some of the nodes in the telecommunications system.

8. A method comprising:
transmitting from a first node to a second node in a telecommunications system a first query for a first data packet in a plurality of packets that are distributed within the telecommunications system, wherein each packet encapsulates part of a set of information that represents the telecommunications system;
receiving, at the first node from the second node, in response to the first query, the first data packet that comprises (i) a first identifier that identifies the first data packet and that is time-dependent and unique within the telecommunications system, (ii) payload data that encapsulates some information from the set of information, and (iii) a first reference to a second data packet; and
transmitting by the first node to a third node in the telecommunications system a second query for the second data packet, wherein the second query comprises the first reference to the second data packet;
wherein each query retrieves at least part of the set of information that represents the telecommunications system.

9. The method of claim 8 wherein the transmission of the first query is based on at least a first rule that describes the handling of at least one data packet.

10. The method of claim 9 further comprising transmitting a second query for a third data packet to a fourth node, wherein the second query comprises a second reference, which is to the third data packet, and wherein the first data packet further comprises the second reference.

11. The method of claim 9 further comprising receiving, at the first node from a fourth node, a second query that comprises at least a second reference, which is to a third data packet; and
when the third data packet is resident at the first node, transmitting the third data packet to the fourth node.

12. The method of claim 9 wherein the first reference identifies the second data packet via a second identifier that is also unique within the telecommunications system.

13. The method of claim 9 wherein a first datum of the payload data of the first data packet and a second datum in the second data packet in combination enable the first node to perform a first telecommunications function.

14. The method of claim 13 wherein the first telecommunications function is the handling of a call that involves a first telecommunications endpoint.

15. The method of claim 14 further comprising:
receiving a first signal from the first telecommunications endpoint; and
transmitting an initial query to retrieve the first data packet, wherein the initial query results in the reception of the first data packet, and wherein the transmission of the initial query is based on the reception of the first signal.

16. A method comprising:
receiving a first query for a first data packet at a first node from a second node; and
when the first data packet is resident at the first node, transmitting:
a) the first data packet to the second node, wherein the first data packet comprises (i) a first identifier that identifies the first data packet, wherein the first identifier is time-dependent and unique within a telecommunications system in which the first identifier is to be utilized, (ii) payload data, and (iii) a first reference to a second data packet; and
b) a second query for the second data packet to a third node, based on the first reference;
wherein a plurality of data packets that comprises the first data packet and the second data packet represents a set of information that is associated with the telecommunications system; and
wherein the payload data in each data packet encapsulates some information in the set of information.

17. The method of claim 16 wherein the transmission of the second query is also based on at least a first rule that describes the handling of at least one data packet.

18. The method of claim 17 further comprising transmitting a third query for a third data packet to a fourth node, wherein the second query comprises a second reference, which is to the third data packet, and wherein the first data packet further comprises the second reference.

19. The method of claim 17 further comprising receiving, at the first node from a fourth node, a third query that comprises at least a second reference, which is to a third data packet; and
when the third data packet is resident at the first node, transmitting the third data packet to the fourth node.

20. The method of claim 17 wherein the first reference identifies the second data packet via a second identifier that is also unique within the telecommunications system.

21. The method of claim 17 wherein a first datum of the payload data of the first data packet and a second datum in the second data packet in combination enable the first node to perform a first telecommunications function based on the set of information.

22. The method of claim 21 wherein the first telecommunications function is the handling of a call that involves a first telecommunications endpoint.

* * * * *